United States Patent
Zhao et al.

(10) Patent No.: US 11,077,416 B2
(45) Date of Patent: Aug. 3, 2021

(54) FEED GAS FEEDING SYSTEM FOR PROPYLENE AMMOXIDATION REACTOR

(71) Applicants: CHINA PETROLEUM & CHEMICAL CORPORATION, Beijing (CN); SHANGHAI RESEARCH INSTITUTE OF PETROCHEMICAL TECHNOLOGY SINOPEC, Shanghai (CN)

(72) Inventors: Le Zhao, Shanghai (CN); Lianghua Wu, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY SINOPEC, Shanghai (CN)

( * ) Notice: Subject to any disclaimer, the term of this patent is extended or adjusted under 35 U.S.C. 154(b) by 0 days.

(21) Appl. No.: 16/762,988

(22) PCT Filed: Jan. 3, 2018

(86) PCT No.: PCT/CN2018/070109
§ 371 (c)(1),
(2) Date: May 11, 2020

(87) PCT Pub. No.: WO2019/095531
PCT Pub. Date: May 23, 2019

(65) Prior Publication Data
US 2020/0276551 A1 Sep. 3, 2020

(30) Foreign Application Priority Data

Nov. 14, 2017 (CN) .......................... 201711128191.X

(51) Int. Cl.
*B01J 4/00* (2006.01)
*B01J 8/24* (2006.01)
(Continued)

(52) U.S. Cl.
CPC ............... *B01J 4/001* (2013.01); *B01J 4/008* (2013.01); *B01J 8/1827* (2013.01); *B01J 8/24* (2013.01);
(Continued)

(58) Field of Classification Search
CPC .. B01J 8/24; B01J 8/1827; B01J 2208/00938; B01J 2208/00893; B01J 2208/00902;
(Continued)

(56) References Cited

U.S. PATENT DOCUMENTS 5,256,810 A * 10/1993 Rowe ..................... B01J 8/1827
558/320
6,284,196 B1 * 9/2001 Casal ................. G01N 21/3504
422/116

(Continued)

FOREIGN PATENT DOCUMENTS

| CN | 1440963 A | 9/2003 |
| CN | 204017797 U | 12/2014 |
| JP | 08208583 A | 8/1996 |

OTHER PUBLICATIONS

Liu, Jingang, "Research on Optimization Control of Acrylonitrile Device," Science—Engineering, No. 6, p. 14 (2017).
(Continued)

*Primary Examiner* — Lessanework Seifu
(74) *Attorney, Agent, or Firm* — Finnegan Henderson Farabow Garrett & Dunner LLP

(57) ABSTRACT

A feed gas feeding system for a propylene ammoxidation reactor comprises a feed gas mixing system and a feed distributor, wherein a propylene and ammonia mixed gas is (Continued)

mixed by the feed gas mixing system and then uniformly distributed in the propylene ammoxidation reactor by the feed distributor. The initial temperature $T_0$ when the propylene and ammonia mixed gas enters the feed distributor is 10-220° C. The feed gas feeding system can prevent the temperature of the gas mixture at any position in the feed distributor from reaching a temperature at which ammonia decomposes into active nitrogen atoms, thereby reducing a risk of brittle nitriding fractures of the feed distributor.

12 Claims, 9 Drawing Sheets

(51) Int. Cl.
*B01J 19/00* (2006.01)
*B01J 8/18* (2006.01)

(52) U.S. Cl.
CPC ....... *B01J 19/0013* (2013.01); *B01J 19/0053* (2013.01); *B01J 2204/002* (2013.01); *B01J 2204/007* (2013.01); *B01J 2219/00063* (2013.01); *B01J 2219/00103* (2013.01); *B01J 2219/00204* (2013.01); *B01J 2219/00238* (2013.01); *B01J 2219/0801* (2013.01)

(58) Field of Classification Search
CPC .......... B01J 2208/00911; B01J 19/0053; B01J 19/0013; B01J 2219/00063; B01J 2219/00103; B01J 2219/00204; B01J 2219/00238; B01J 4/001; B01J 4/002; B01J 4/004; B01J 2204/002; B01J 2204/007
See application file for complete search history.

(56) References Cited

U.S. PATENT DOCUMENTS

2016/0257644 A1* 9/2016 McDonel .............. C07C 253/26
2019/0152898 A1* 5/2019 Shouche ............... B01J 8/1836

OTHER PUBLICATIONS

International Search Report of International Application No. PCT/CN2018/070109, dated Aug. 21, 2018.

* cited by examiner

FEED GAS FEEDING SYSTEM FOR
PROPYLENE AMMOXIDATION REACTOR

CROSS-REFERENCE TO RELATED
APPLICATIONS

This application is a national stage filing under 35 U.S.C. § 371 of International Application No. PCT/CN2018/070109, filed on Jan. 3, 2018, which claims priority of Chinese Patent Application No. 201711128191.X, filed on Nov. 14, 2017, which is incorporated herein by reference in its entirety.

FIELD OF THE INVENTION

The present disclosure relates to a feed gas feeding system for a propylene ammoxidation reactor and a method for controlling a temperature of a propylene and ammonia mixed gas in a propylene ammoxidation reactor through the feed system.

BACKGROUND OF THE INVENTION

Acrylonitrile is an important chemical raw material in petrochemical industry, and acrylonitrile is generally produced by one-step propylene ammoxidation in various countries.

Since the active temperature of current commercial propylene ammoxidation catalysts is in the range of 400-450° C., a propylene and ammonia feed distributor (hereinafter sometimes also referred to as "propylene and ammonia distributor", "feed distributor", or "distributor") is at a high temperature for a long period of time in the production of acrylonitrile. A propylene and ammonia mixed gas (hereinafter referred to as gas mixture) in the feed distributor is continuously heated by a reactor bed while flowing through header pipes/main pipes/branch pipes (hereinafter collectively referred to as pipes) of the feed distributor. As the traveling length of the gas mixture in the pipes increases, the temperature of the gas mixture also increases. When the temperature of the gas mixture is higher than a temperature (hereinafter sometimes referred to as nitridation temperature) at which ammonia decomposes into active nitrogen atoms, due to the continued presence of free ammonia in the gas mixture, part of the ammonia decomposes into active nitrogen atoms, which are bonded to metal atoms in the pipes to form a brittle metal nitride. The nitride is prone to brittle fractures under working conditions, causing fractures of the feed distributor, resulting in nonuniform distribution of propylene and ammonia, resulting in degradation of reaction performance; in severe cases, the reactor is forced to stop working and the distributor has to be replaced. The document "Analysis of Reasons of Fractures of Distribution Pipe of Distributor of Reactor" analyzed reasons of brittle fractures of propylene and ammonia distributor are analyzed in. The document "Exploration of Material Selection for Propylene and Ammonia Distributor" holds that ammonia can decompose into active nitrogen atoms at 350-450° C. At present, the material used in propylene and ammonia distributors is mainly carbon steel. Depending on the specific materials used in carbon steel, the nitridation temperature of propylene and ammonia distributors (i.e., the temperature at which nitridation of the carbon steel forming the propylene and ammonia distributors will occur) also varies, but the existing research results indicate that the nitridation temperature of various carbon steels falls within the above range of temperature at which ammonia decomposes.

Patent CN1081482C discloses that the aperture of a discharge hole of a propylene and ammonia distributor is temperature dependent, but this patent does not take into account the nitridation of the propene and ammonia distributor. In other words, the apparatus is at risk of increased frequency of distributor replacement. There are also patents, such as U.S. Pat. No. 3,704,690A, in which a nitride-resistant alloy is used to manufacture a distributor, but due to certain problems and costs specific to ammoxidation, it has also been shown that the problem of brittle nitriding fractures cannot be solved during use of the distributor in acrylonitrile production enterprises. In addition, patent CN1089596A proposes to provide an insulating layer on the outer surface of each pipe so that the temperature of an ammonia-containing gas mixture in the pipes is lower than the temperature of the nitriding reaction, but this solution is also unsatisfactory due to the complexity of the design and the high costs of the equipment.

The present disclosure provides a propylene and ammonia feed gas feeding system for ammoxidation of propylene and the preparation of acrylonitrile. The feeding system can prevent the temperature of a gas mixture at any position in the propylene and ammonia feed distributor from reaching or even being higher than a temperature, for a long period of time, at which ammonia decomposes into active nitrogen atoms, thereby reducing a risk of brittle nitriding fractures of the propylene and ammonia distributor.

SUMMARY OF THE INVENTION

The technical problem to be solved by the present invention is that in a conventional apparatus, a local temperature of a propylene and ammonia distributor is higher than a nitridation temperature, which causes brittle nitriding fractures of the distributor, which causes nonuniform distribution of a feed gas and deterioration of reaction results. The present disclosure provides a propylene and ammonia feed gas feeding system for ammoxidation of propylene and the preparation of acrylonitrile. The feeding system includes a feed gas mixing system, a feed distributor, and related applications, and can prevent the temperature of a gas mixture at any position in the propylene and ammonia feed distributor from reaching a temperature at which ammonia decomposes into active nitrogen atoms, thereby reducing a risk of brittle nitriding fractures of the propylene and ammonia distributor.

The present disclosure provides a feeding system for a propylene ammoxidation reactor, the feeding system including a feed gas mixing system and a feed distributor, wherein a propylene and ammonia mixed gas is mixed by the feed gas mixing system and then uniformly distributed in the propylene ammoxidation reactor by means of the feed distributor, wherein an initial temperature $T_0$ when the propylene and ammonia mixed gas enters the feed distributor is 10-220° C.

According to the feeding system, preferably, the initial temperature $T_0$ is 20-200° C.

According to the feeding system, preferably, the initial temperature $T_0$ is 35-185° C.

According to the feeding system, preferably, the propylene ammoxidation reactor has a diameter of 5-12 meters.

According to the feeding system, preferably, the propylene ammoxidation reactor has a diameter of 7.5-12 meters.

According to the feeding system, preferably, the propylene ammoxidation reactor has a diameter of 8.5-12 meters.

According to the feeding system, preferably, the feed gas mixing system includes a propylene evaporator, a propylene superheater, an ammonia evaporator, an ammonia superheater, and a pipeline mixer, wherein the propylene evaporator and the ammonia evaporator are in communication with the pipeline mixer, respectively, the propylene superheater is provided between the propylene evaporator and the pipeline mixer, and the ammonia superheater is provided between the ammonia evaporator and the pipeline mixer, and wherein the pipeline mixer is an empty pipeline, or a pipeline provided with an inner component.

According to the feeding system, preferably, the feed gas mixing system further includes an initial temperature $T_0$ control system, the initial temperature $T_0$ control system including:

a transmitter provided at an inlet of the feed distributor and configured to detect the initial temperature $T_0$;

a heat source configured to supply heat to the propylene superheater and the ammonia superheater;

bypass valves provided on a pipeline connected between the heat source and the propylene superheater and on a pipeline connected between the heat source and the ammonia superheater, respectively; and controllers configured to receive a signal from the transmitter and adjust an opening degree of the respective bypass valves in response to the signal from the transmitter, so as to achieve control of the initial temperature $T_0$.

The present disclosure further provides a method for controlling a temperature of a propylene and ammonia mixed gas in a propylene ammoxidation reactor, the propylene ammoxidation reactor includes a feeding system, the feeding system including a feed gas mixing system and a feed distributor, wherein a propylene and ammonia mixed gas is mixed by the feed gas mixing system and then uniformly distributed in the propylene ammoxidation reactor by means of the feed distributor, and the method including: enabling an initial temperature $T_0$ when the propylene and ammonia mixed gas enters the feed distributor to be 10-220° C.

According to the method for controlling a temperature of a propylene and ammonia mixed gas in a propylene ammoxidation reactor of the present disclosure, preferably, the method includes: enabling the initial temperature $T_0$ when the propylene and ammonia mixed gas enters the feed distributor to be 20-200° C.

According to the method for controlling a temperature of a propylene and ammonia mixed gas in a propylene ammoxidation reactor of the present disclosure, preferably, the method includes: enabling the initial temperature $T_0$ when the propylene and ammonia mixed gas enters the feed distributor to be 35-185° C.

According to the method for controlling a temperature of a propylene and ammonia mixed gas in a propylene ammoxidation reactor of the present disclosure, preferably, the propylene ammoxidation reactor has a diameter of 5-12 meters.

According to the method for controlling a temperature of a propylene and ammonia mixed gas in a propylene ammoxidation reactor of the present disclosure, preferably, the propylene ammoxidation reactor has a diameter of 7.5-12 meters.

According to the method for controlling a temperature of a propylene and ammonia mixed gas in a propylene ammoxidation reactor of the present disclosure, preferably, the propylene ammoxidation reactor has a diameter of 8.5-12 meters.

According to the method for controlling a temperature of a propylene and ammonia mixed gas in a propylene ammoxidation reactor of the present disclosure, the method further includes steps of controlling the initial temperature $T_0$, the steps including:

supplying heat to a propylene superheater and an ammonia superheater by means of a heat source;

detecting the initial temperature $T_0$ using a transmitter provided at an inlet of the feed distributor; and adjusting, according to the initial temperature $T_0$ detected by the transmitter, an opening degree of bypass valves provided on a pipeline connected between the heat source and the propylene superheater and on a pipeline connected between the heat source and the ammonia superheater, respectively, so as to adjust the initial Temperature $T_0$.

BRIEF DESCRIPTION OF THE DRAWINGS

The drawings described herein are for explanatory purposes only and are not intended to limit the scope of the present disclosure in any way. In addition, the shapes, proportions, and the like of various components in the drawings are only schematic, and are used for assisting the understanding of the present disclosure rather than specifically limiting the shapes and proportions of various components of the present disclosure. With the teaching of the present disclosure, those skilled in the art can implement the present disclosure by selecting various possible shapes and proportions according to specific circumstances.

Figure 1:
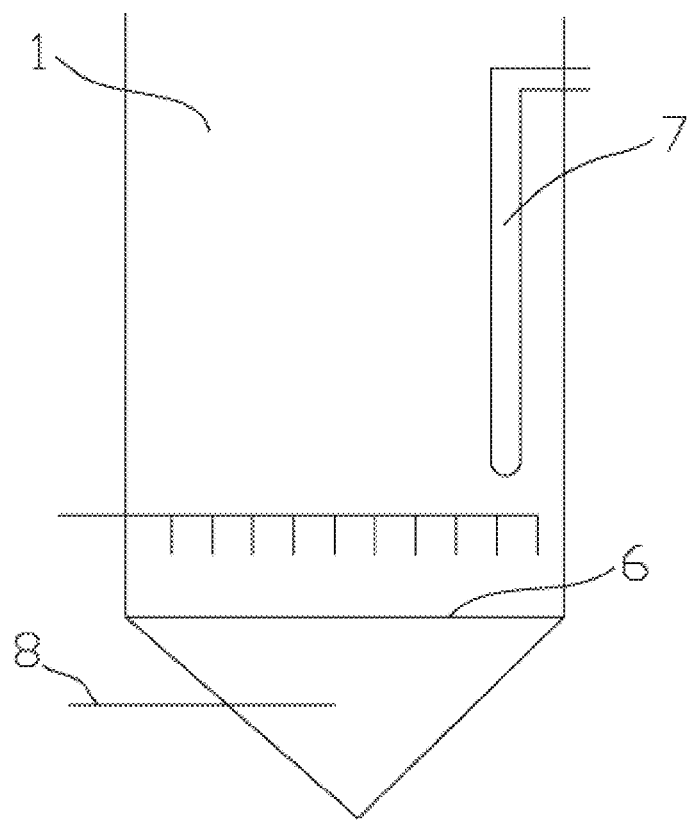
FIG. 1 is a schematic diagram of a propylene ammoxidation fluidized bed reactor of the prior art.

DESCRIPTION OF REFERENCE SIGNS 1 propylene ammoxidation reactor
2 feed gas mixing system
3 nozzle
6 air distribution plate
7 cooling coil
10 feed distributor
11 propylene evaporator
12 ammonia evaporator
13 propylene superheater
14 ammonia superheater
15 pipeline mixer
16 inner member
x header pipe
y main pipe z branch pipe
LP heat source

DETAILED DESCRIPTION OF THE EMBODIMENTS

The embodiments of the present disclosure will be explained in detail with reference to the accompanying drawings.

Figure 6:
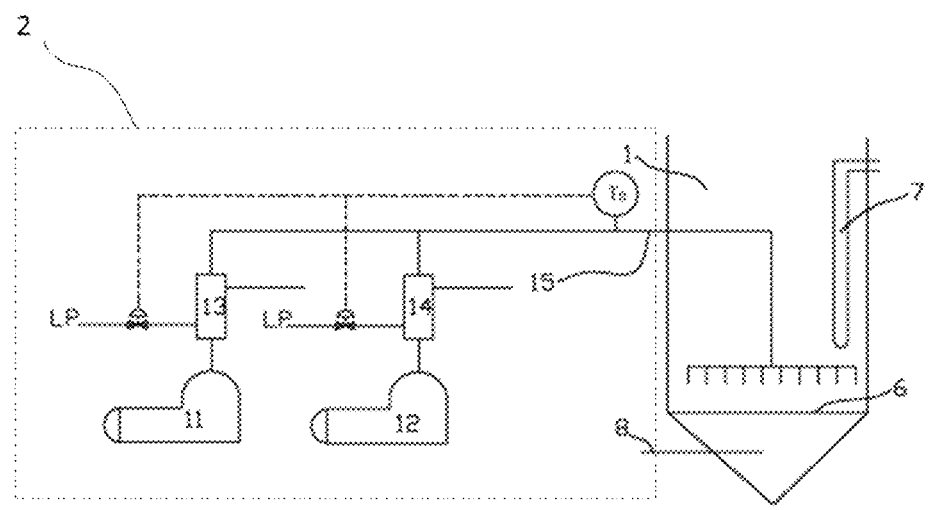
FIG. 6 is a schematic diagram of an initial temperature $T_0$ control system of a feeding system of the present disclosure.

As shown in FIG. 6, a feed gas feeding system of a propylene ammoxidation reactor of the present disclosure includes a feed gas mixing system 2 and a feed distributor 10.

Raw material propylene enters a mixing pipe from a propylene evaporator 11 through a propylene superheater 13, and raw material ammonia also enters the mixing pipe from an ammonia evaporator 12 through an ammonia superheater 14. The raw material propylene and the raw material ammonia are fully mixed in the mixing pipe, and then the gas mixture is uniformly fed into a catalyst bed through a feed distributor 10.

A skilled person understands that in order to achieve the best results, it is necessary that the propylene and ammonia feed distributor should feed propylene and ammonia to a reactor as uniformly as possible so that the propylene and ammonia mixed gas is distributed as uniformly as possible in a range from a reactor wall to a center of the reactor.

Figure 4A:
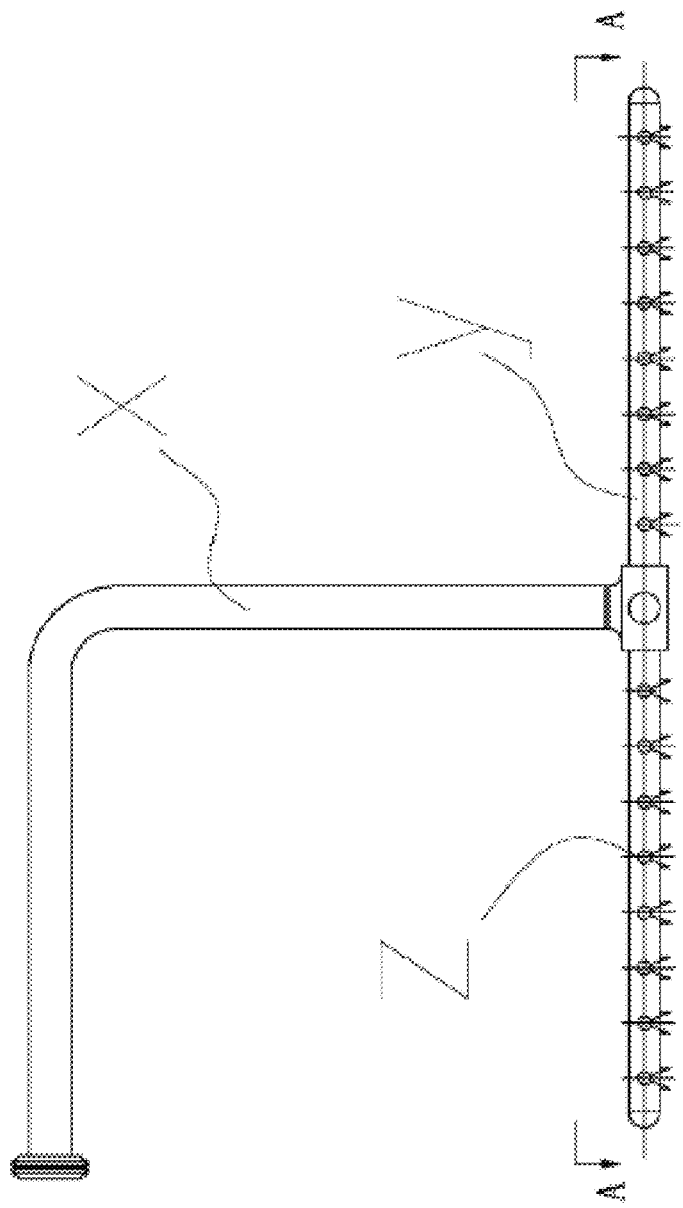
FIG. 4A is a side view of an embodiment of the propylene and ammonia distributor of the present disclosure.
Figure 4B:
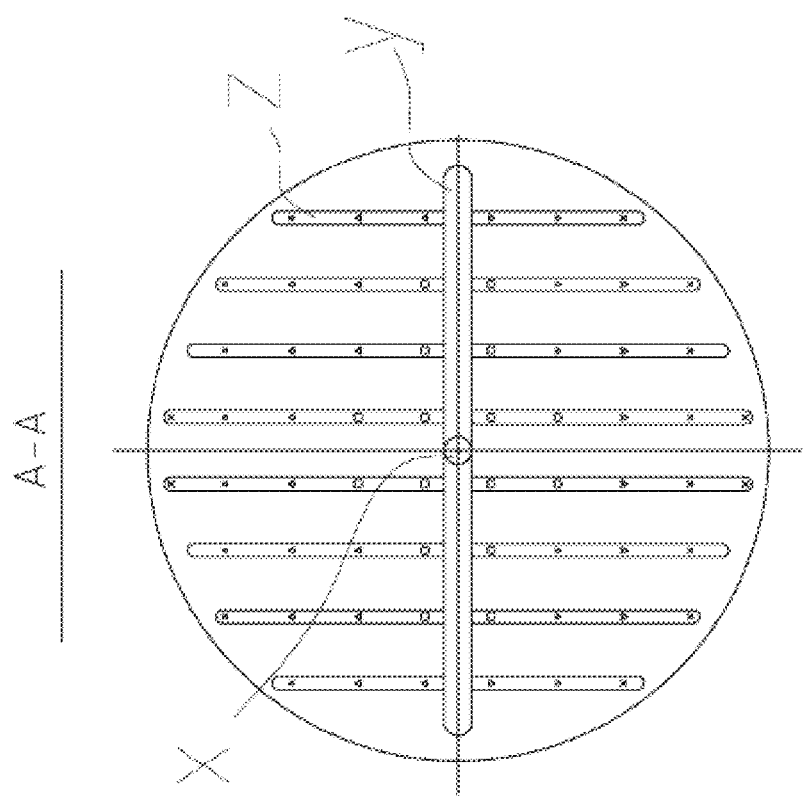
FIG. 4B is a sectional view taken along line A-A in FIG. 4A.
Figure 4C:
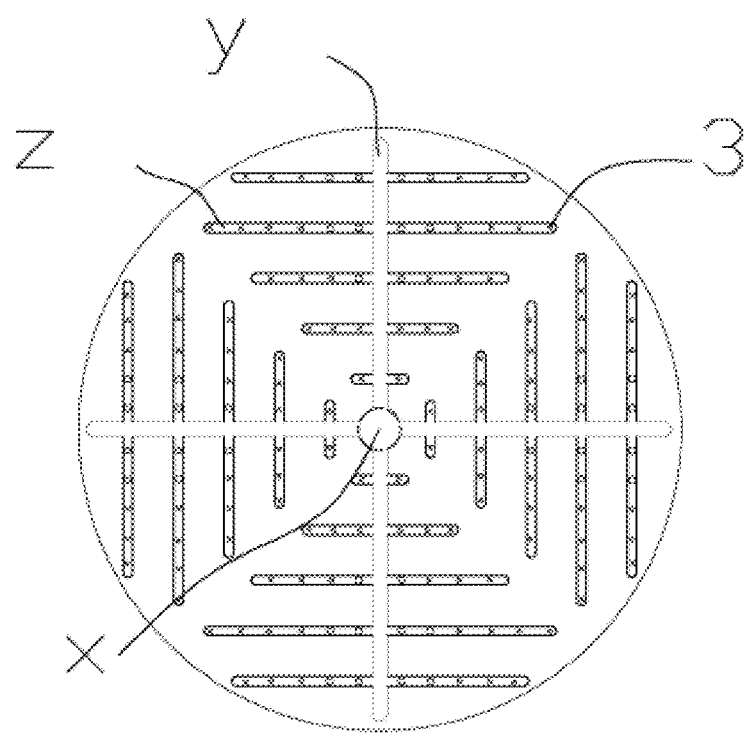
FIGS. 4C and 4D are respectively top views of propylene and ammonia feed distributors of other embodiments of the present disclosure.

In a typical propylene ammoxidation reactor 1, a feed distributor 10 is located between an air distribution plate 6 and a cooling coil 7. As shown in FIGS. 4A to 4C, according to the present disclosure, the feed distributor 10 includes a distributor inlet, and gas-guide pipes and nozzles located inside the reactor.

The distributor inlet is configured to introduce a gas mixture into the reactor through a reactor wall. According to some embodiments of the present disclosure, there is only one distributor inlet. According to other embodiments of the present disclosure, there may be multiple distributor inlets. When there are multiple distributor inlets, these distributor inlets are usually uniformly distributed on a same cross section of the circumference of the reactor wall at a same interval.

According to the present disclosure, the gas mixture directly enters the reactor bed through the nozzles. The nozzles are in fluid communication with the gas-guide pipes, and all nozzle openings should be located in a same cross section, and arranged in the reactor in a manner so as to achieve uniform distribution of the gas mixture.

According to the present disclosure, the gas guide pipes include a header pipe x (x-pipe), a main pipe y (y-pipe), and/or a branch pipe z (z-pipe).

The z-pipe is a gas guide pipe in direct fluid communication with nozzles, and mainly plays a role in transporting the gas mixture to the nozzles. z-pipes are unbranched pipes and are arranged in a same cross section of the reactor, and orifices are uniformly distributed on the z-pipes in a certain manner so that the z-pipes are in communication with nozzles, thereby achieving the uniform distribution of the nozzle openings described above in a cross section of the reactor. According to some embodiments of the present disclosure, the z-pipes may be straight pipes.

The y-pipe is a gas guide pipe in direct fluid communication with the z-pipes, and mainly plays a role in transporting the gas mixture to the z-pipes. According to some embodiments of the present disclosure, the z-pipes are uniformly connected to the y-pipe and the y-pipe is located in the same cross section of the reactor as the z-pipes, so as to achieve the uniform distribution of the nozzle openings described above in a cross section of the reactor. In some embodiments, in addition to being in fluid communication with the z-pipes, the y-pipe, similar to the z-pipes, is also in direct fluid communication with nozzles through orifices so as to assist in achieving the uniform distribution of the nozzle openings described above in a cross section of the reactor. According to some embodiments of the disclosure, the y-pipe may be a straight pipe.

The x-pipe is a gas guide pipe in direct fluid communication with the y-pipe, and mainly plays a role in transporting the gas mixture to the y-pipe. According to some embodiments of the present disclosure, the z-pipes and the y-pipe are located in a same cross section of the reactor, but they are not on the same plane as the feed distributor inlet, and therefore the x-pipe is provided to introduce the propylene and ammonia mixed gas from the feed distributor inlet to the y-pipe. According to some embodiments of the present disclosure, only one x-pipe is needed, and the x-pipe does not have any branches at other positions except for being in fluid communication with the y-pipe at an end of the x-pipe.

Figure 2:
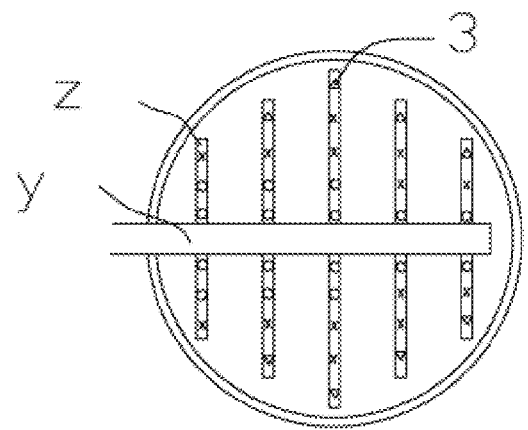
FIG. 2 is a schematic diagram showing a structure of an embodiment of a propylene and ammonia distributor of the present disclosure.
Figure 3:
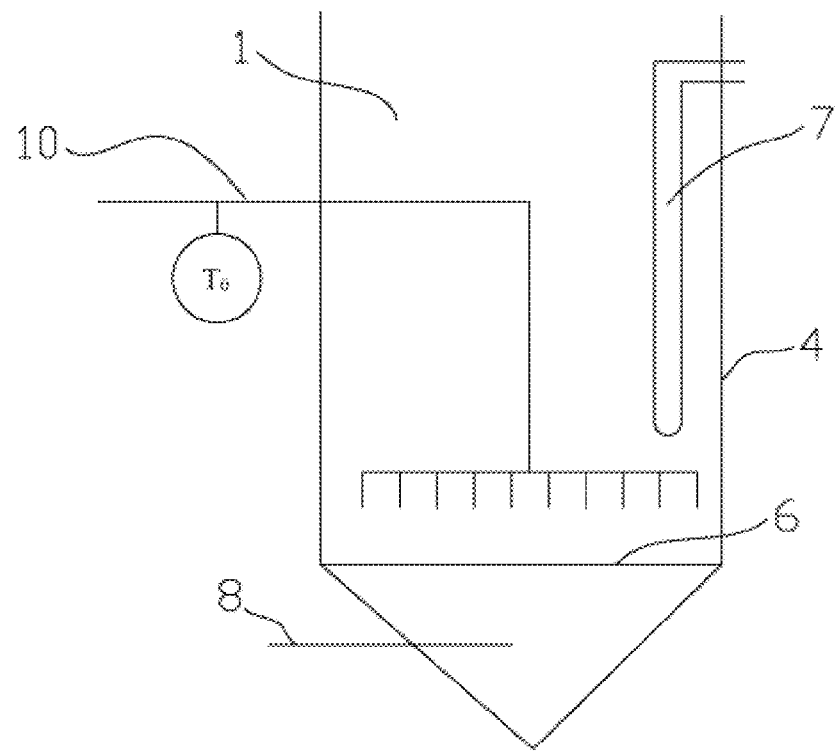
FIG. 3 is a schematic diagram of a propylene ammoxidation fluidized bed reactor of the present disclosure.
Figure 4D:
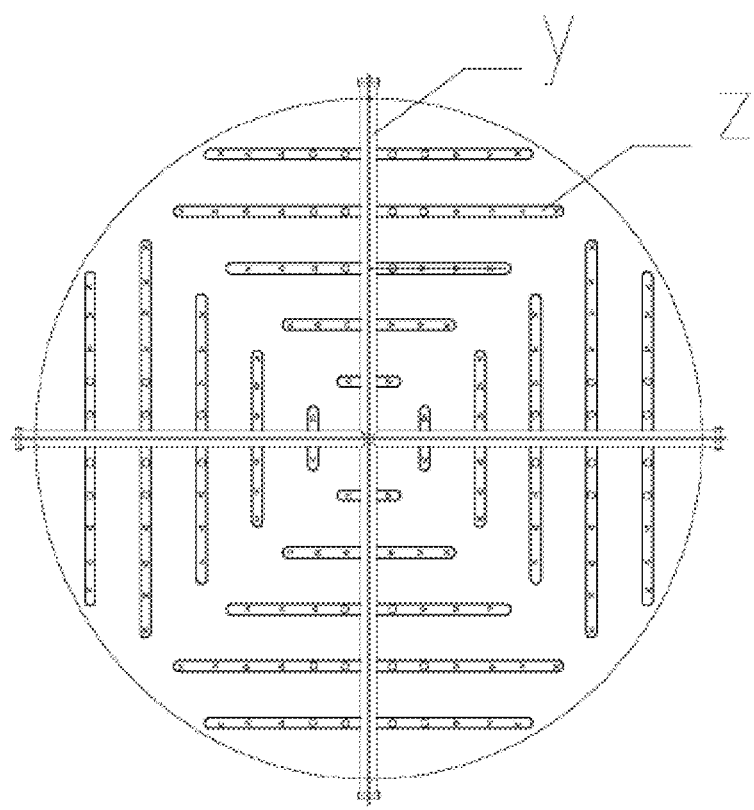
Figure 7:
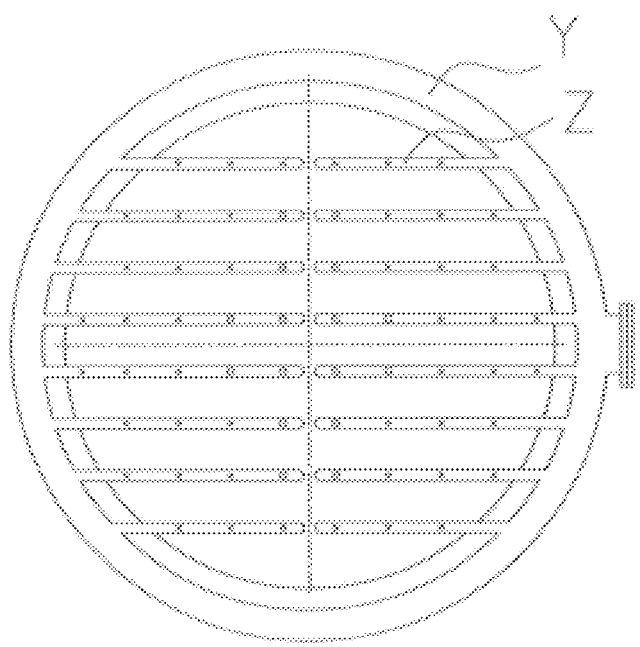
FIG. 7 is a schematic diagram showing a structure of an embodiment of a propylene and ammonia distributor of the present disclosure.

In some embodiments of the present disclosure, the feed distributor may include only a y-pipe(s) and z-pipes, the y-pipe(s) being in direct communication with a distributor inlet(s) (as shown in FIGS. 2 and 4D). In other embodiments of the present disclosure, the feed distributor may include only z-pipes, which are in direct communication with distributor inlets (as shown in FIG. 7).

Thus, according to the present disclosure, the propylene and ammonia mixed gas enters from the inlet of the propylene and ammonia feed distributor, passes along the x-, y-, and z-pipes, or along the y- and z-pipes, or only along the z-pipes, and finally passes through the orifices provided on the y-pipe or the z-pipe and are uniformly dispersed into the reactor bed through the nozzles.

The propylene and ammonia mixed gas is heat-exchanged with the catalyst bed in the process when the gas mixture is uniformly fed to the catalyst bed along the pipes of the feed distributor, causing the temperature of the gas mixture to continuously rise until it reaches the highest temperature before entering the reactor through the nozzles. However, industrial practice and related studies have shown that the temperature of the gas mixture at any position in the propylene and ammonia feed distributor is required to be always lower than the nitridation temperature of the feed distributor. This is because if the temperature of the gas mixture passing somewhere in the feed distributor is continuously higher than the nitridation temperature of the feed distributor, the feed distributor that has been at this temperature for a long period of time is extremely prone to being nitrided at said position and brittle fractures may be caused, thereby increasing the risks of nonuniform distribution of the gas mixture and replacement of the feed distributor. As far as the structural design of the propylene and ammonia distributor is concerned, this is not allowed.

The propylene and ammonia mixed gas is continuously heated in the feed distributor, and the temperature $T_i$ of the gas mixture at any point and the temperature rise $\Delta T_i$ thereof at said point can actually be represented by formula (1):

$$T_i = T_0 + \Delta T_i \tag{1}$$

According to formula (1), the temperature $T_i$ of the propylene and ammonia mixed gas at any position in the feed distributor is determined by the temperature $T_0$ (hereinafter sometimes referred to as initial temperature $T_0$) when the propylene and ammonia mixed gas enters the feed distributor, and the temperature rise $\Delta T_i$ of the propylene and ammonia mixed gas in the feed distributor.

Therefore, as long as the initial temperature $T_0$ and/or the temperature rise $\Delta T_i$ can be reasonably controlled or adjusted, the temperature $T_i$ of the propylene and ammonia mixed gas at any position in the feed distributor can be effectively controlled to be lower than the nitridation temperature of the feed distributor. For example, when the initial temperature $T_0$ is determined, the temperature rise $\Delta T_i$ can be controlled or adjusted to prevent the temperature Ti from exceeding the nitridation temperature; alternatively, when the temperature rise $\Delta T_i$ is determined, the initial temperature $T_0$ can also be controlled or adjusted to achieve effective control of the temperature $T_i$ so as to make the temperature $T_i$ lower than the nitridation temperature.

In the present disclosure, through a lot of basic research and simulation calculations, and by repeated experimental verification, the inventor found that the temperature rise $\Delta T_i$ of the propylene and ammonia mixed gas when traveling along the pipes of the feed distributor is restricted by the heat exchange between the gas mixture and the reactor bed, and is related to the reactor diameter, shape of the feed distributor, temperature difference between the gas mixture in the pipes and the reactor bed, mass flow of the gas mixture, heat transfer coefficient and the like. In summary, these relationships can be represented by the following formula (2):

$$\Delta T_i \propto f(D, d, T_0, G, T_R, K, \ldots) \quad (2),$$

wherein $\Delta T_i$ is the temperature rise of the propylene and ammonia mixed gas at point i in the feed distributor, ° C.;
D is the reactor diameter;
d is the structural factor of the feed distributor;
G is the mass flow of the gas mixture;
$T_0$ is the temperature when the propylene and ammonia mixed gas enters the feed distributor, ° C.;
$T_R$ is the reaction temperature, ° C.; and
K is the heat transfer coefficient.

Based on the analysis of the above influencing factors, the inventor summarized the relevant findings. After determining factors such as the reactor size, feed distributor structure, and mass flow rate of the gas mixture, in combination with computer simulation calculations and experimental verification, a method for controlling the temperature rise $\Delta T_i$ of the propylene and ammonia mixed gas in the feed distributor was obtained in practice.

Specifically, according to the present disclosure, after determining factors such as the reactor size, feed distributor structure, and mass flow rate of the gas mixture, the temperature rise $\Delta T_i$ of the propylene and ammonia mixed gas in the feed distributor can be further refined and represented by formula (3):

$$\Delta T_i = aX + bY + c_j Z \quad (3)$$

wherein, X, Y, and Z represent the lengths of the traveling paths of the propylene and ammonia mixed gas along the x-, y-, and z-pipes, respectively, in meters (m); a and b represent the average rates of temperature rise per unit length when the propylene and ammonia mixed gas travels in the x- and y-pipes, respectively, in ° C./m; and $c_j$ represents the rate of temperature rise per unit length when the propylene and ammonia mixed gas travels in any z-pipe, in ° C./m, wherein j represents an integer of 1 or more. Therefore, formula (3) actually shows that the temperature rise $\Delta T_i$ can be calculated based on the lengths of the traveling paths of the propylene and ammonia mixed gas in the pipes of the feed distributor and the average rates of temperature rise of the propylene and ammonia mixed gas flowing through respective pipes of the feed distributor, and correspondingly, the control of the temperature rise $\Delta T_i$ can thus be achieved.

The lengths of the traveling paths of the mixed gas in the pipes of the feed distributor depend on the structure of the feed distributor and the corresponding size thereof. Although there are propylene and ammonia mixed gas feed distributors of various structures and sizes in actual production, according to the present disclosure, regardless of the structure and size of the propylene and ammonia mixed gas feed distributor, the total traveling length of the gas mixture in the x-, y- and/or z-pipes from the feed distributor inlet to the nozzles should be as short as possible in order to correspondingly reduce the temperature rise $\Delta T_i$ of the gas mixture in the pipes.

To achieve the above purpose, different combinations of x-, y-, and/or z-pipes of different lengths need to be used in the feed distributor to reduce the traveling distance of the gas mixture in the feed distributor in spatial arrangement.

For example, in some embodiments of the present disclosure, the shape of the x-pipe is not particularly limited, and can be designed according to an actual situation of the reactor. The length of the traveling path of the propylene and ammonia mixed gas in the x-pipe can be in the range of 0-20 meters. When the feed distributor of a form as shown in FIG. 2 and FIG. 4D is adopted, the feed distributor inlet(s) and the y- and z-pipes are arranged in a same horizontal cross section of the reactor 1. At this time, the length of the x-pipe may be 0.

As another example, in some embodiments of the present disclosure, the distributor usually includes a y-pipe. The number of y-pipes may be from 1-8, preferably 2 or 4, and most preferably 4. According to the present disclosure, the traveling length of the propylene and ammonia mixed gas in a y-pipe should be in the range of 0 to the radius of the reactor, so that the purpose of uniform gas feeding can be achieved without allowing the gas mixture to flow over a long distance in the y-pipe. In some embodiments, the y-pipe may also be provided with a plurality of orifices in fluid communication with nozzles, thereby assisting z-pipes to achieve uniform distribution of the propylene and ammonia mixed gas in the reactor.

As another example, in some embodiments of the present disclosure, the z-pipe is provided thereon with a plurality of orifices in fluid communication with nozzles, so as to directly feed the propylene and ammonia mixed gas into the reactor, and therefore there must be z-pipes. The shape and arrangement of z-pipes should meet the requirement that nozzles arranged on the z-pipes can distribute the propylene and ammonia mixed gas uniformly in the reactor. According to the present disclosure, in general, the traveling length of the propylene and ammonia mixed gas in a z-pipe should also be in the range of 0 to the radius of the reactor, so that the purpose of uniform gas feeding can be achieved without allowing the gas mixture to flow over a long distance in the z-pipe.

In addition to the path length of the mixed gas flowing through the feed distributor, it can also be seen from formula (3) that the temperature rise $\Delta T_i$ is also closely related to the average rates of temperature rise of the propylene and ammonia mixed gas in respective pipes of the feed distributor. According to the present disclosure, the average rate of temperature rise of the gas mixture in a pipe is affected by many factors such as the temperature difference between the inside and outside of the pipe, pipe diameter, and mass flow of the gas mixture flowing through the pipe.

For example, the average rate of temperature rise of the gas mixture flowing through a pipe is determined by the temperature difference between the gas mixture and the outside world. Under otherwise identical conditions, if the initial temperature $T_0$ when the propylene and ammonia mixed gas enters the pipe is high, and has a small temperature difference with the reactor bed outside the pipe, the average rate of temperature rise will be decreased.

As another example, the average rate of temperature rise of the gas mixture flowing through a pipe is also affected by the pipe diameter. Under otherwise identical conditions, the average rate of temperature rise of the gas mixture becomes smaller as the pipe diameter increases. Only in theory, when the diameter of the pipe is increased to a certain degree, the change in the rate of temperature rise can be ignored.

As another example, the average rate of temperature rise of the gas mixture in a pipe is also affected by the mass flow of the gas mixture. Under otherwise identical conditions, if the propylene and ammonia mixed gas transported in the pipe does not have a change in mass flow during transportation, the change in average rate of temperature rise of the gas mixture while passing through the pipe can be considered to be basically a fixed value. However, when the gas mixture is continuously distributed in the pipe through the branches, causing the mass flow of the gas mixture flowing through the pipe to be decreased, the average rate of temperature rise will be increased.

It should be noted that the above influencing factors are combined so as to produce effects. For example, it is assumed that the gas mixture passes through a z-pipe with a constant diameter, and the z-pipe is provided thereon with nozzles spaced apart along a traveling direction of the gas mixture so that the gas mixture can enter the reactor successively through these nozzles. Although the mass flow of the gas mixture in the pipe along the traveling direction of the gas mixture continues to be decreased due to the continuous flow of the gas mixture into the reactor, the average rate of temperature rise of the gas mixture in the pipe will not be continuously increased. This is because the continuous temperature rise of the gas mixture in the flowing process causes a gradual decrease in temperature difference between the gas mixture and the reactor bed outside the pipe, and the decrease in temperature difference will correspondingly reduce the average rate of temperature rise of the gas mixture. In this way, the rates of temperature rise of the propylene and ammonia mixed gas at a start end of the traveling direction of the propylene and ammonia mixed gas in the pipe and at a tail end of the traveling direction of the propylene and ammonia mixed gas in the pipe, may be relatively greater (the temperature of the propylene and ammonia mixed gas is relatively lower at said start end, which causes a large temperature difference between the inside and the outside of the pipe, and therefore the average rate of temperature rise of the gas mixture is increased; the continuous diversion of the gas mixture causes a decrease in mass flow of the propylene and ammonia mixed gas reaching said tail end, and therefore the average rate of temperature rise of the gas mixture is increased accordingly), and the rate of temperature rise of the propylene and ammonia mixed gas at a middle portion of the traveling direction of the propylene and ammonia mixed gas may be relatively small. For the entire length of the pipe, a saddle-shaped change in rate of temperature rise is formed.

In modern acrylonitrile production processes, in order to achieve great production capacity and high yields, the sizes of reactors are large. In order to achieve uniform gas feeding in a reactor, a propylene and ammonia feed distributor used for the reactor also needs to have a relatively large size, and thus forms a complex structure. In this case, in order to control the temperature of a propylene and ammonia mixed gas in the feed distributor so that it does not exceed a corresponding nitridation temperature, the structure of the feed distributor needs to be accurately designed and arranged, and the initial temperature of the mixed gas also needs to be reasonably controlled accordingly, so as to ensure that the temperature rise of the propylene and ammonia mixed gas in pipes can be fully controlled.

In terms of reactor size, due to limitation of the performance of commercial catalysts, the size of an acrylonitrile reactor in modern industrial production is actually closely related to production capacity. In actual production, reactors with too small diameters have been phased out due to low production capacity and high costs. Moreover, reactors cannot be oversized due to the processability of reactor equipment and the requirements of the catalyst loading amount for air distribution plates and foundations. At present, the reactor diameter in the actual production of acrylonitrile by ammoxidation of propylene is in the range of 5-12 meters. With the use of current commercial catalysts, the corresponding production scale of acrylonitrile is about 40-200 kilotons per year. Therefore, regarding the structural design of the feed distributor, adjustment and arrangement must be made in accordance with this range of reactor size.

It should be understood that if the reactor size becomes larger, the size of the feed distributor must be enlarged accordingly. This requires gas guide pipes of a sufficient length and arrangement density to ensure the uniform distribution of a gas mixture in the reactor. Accordingly, this also means that it is necessary to consider that the gas mixture needs to travel a sufficient distance in the distributor so as to be fed into the reactor. As described above, in the case of the same average rate of temperature rise of a gas guide pipe, it means that the temperature rise $\Delta T$ of the gas mixture in the gas guide pipe becomes greater. At this time, in order to control the temperature of the gas mixture finally flowing out from nozzles, an initial temperature $T_0$ of the gas mixture needs to be adjusted accordingly.

In addition, when the annual yield of acrylonitrile is fixed, the total mass flow of the propylene and ammonia mixed gas entering the reactor through the feed distributor is generally relatively constant. However, during the traveling process when the propylene and ammonia mixed gas with a certain mass flow enters the reactor through the feed distributor, according to the change of the shape of the feed distributor, the mass flow of the propylene and ammonia mixed gas will be continuously redistributed in respective gas guide pipes through which the gas mixture flows. At the same time, the gas mixture is continuously released into the reactor through the nozzles while flowing through y- and/or z-pipes, which will also cause continuous reduction of the mass flow of the mixed gas in the pipes.

For example, according to an embodiment of the present disclosure, in a feed distributor shown in FIG. 4C, an x-pipe of a propylene and ammonia feed distributor feeds a propylene and ammonia mixed gas into four y-pipes and each y-pipe feeds the gas mixture into multiple z-pipes, so as to achieve uniform distribution of the gas mixture. In this way, as the number of pipes increases, the mass flow of the gas mixture in a single x-pipe must be greater than the mass flow of the gas mixture in a single y-pipe, and the mass flow of the gas mixture in a single y-pipe must be greater than the mass flow of the gas mixture in a corresponding single z-pipe. At the same time, as described above, orifices and nozzles are also provided on the y- and z-pipes. In the process when the gas mixture follows through these pipes, the gas mixture will continuously enter the reactor through the nozzles, thereby further resulting in reduction of the mass flow of the gas mixture in the pipes.

As described above, the mass flow of the gas mixture in a pipe directly affects the rate of temperature rise of the gas mixture, and a decrease in mass flow of the gas mixture flowing through the pipe will cause the average rate of temperature rise of the gas mixture in the pipe to be increased. Therefore, arranging too many branches in the feed distributor to form z- and/or y-pipes, arranging long z- and/or y-pipes, and arranging nozzles with small intervals on the pipes will surely make it more difficult to control the temperature rise $\Delta T_i$ of the gas mixture. However, in order to achieve uniform distribution of the propylene and ammonia mixed gas in the reactor, the feed distributor must be arranged with long gas guide pipes and many branches as well as dense nozzles. Therefore, in the design of the propylene and ammonia feed distributor, these two factors must be considered simultaneously.

In order to control the temperature rise $\Delta T_i$ in the feed distributor, one possible means is to increase the diameters of these branch pipes. However, since the y- and z-pipes are parallel to the cross section of the reactor and perpendicular to the fluidization direction of the reactor bed, excessively large pipe diameters will occupy a large area of the cross section of the reactor, resulting in poor fluidization quality of the catalyst bed. Therefore, when designing the feed distributor, it is necessary to consider this factor as much as possible to reduce the cross-sectional area of the reactor occupied by the feed distributor, so that the overall cross-sectional area occupied by the distributor is reduced so as not to affect the fluidization reaction in the reactor bed (for example, when designing the shape of the propylene and ammonia feed distributor, it is always necessary to design in such a way that the diameter of the y-pipe (pipe diameter) is smaller than the diameter of the x-pipe, and the diameter of the z-pipe is much smaller than the diameter of the y-pipe).

The inventor has done a lot of exploration and practice on this. According to the findings of the inventor, considering that the fluidization effect cannot be not affected, the upper limit of the diameter of the z-pipe is preferably 120 mm or less, and more preferably 115 mm or less. When the above upper limit is exceeded, the total cross-sectional area of the reactor will be excessively occupied, which will affect the fluidization quality of the catalyst bed. However, since nozzles need to be installed on the z-pipe, considering the processability of the feed distributor, the lower limit of the diameter of the z-pipe is preferably 70 mm or more, and more preferably 75 mm or more. When the above lower limit is exceeded, the pipe processability becomes poor, and it will be difficult to install nozzles on the pipe.

Since the z-pipe needs to be installed on the y-pipe, the diameter of the y-pipe is preferably larger than the diameter of the z-pipe, and the lower limit of the diameter of the y-pipe is 180 mm or more, and preferably 200 mm or more. However, considering the effect of the fluidization reaction, the upper limit of the diameter of the y-pipe is preferably 400 mm or less, and more preferably 370 mm or less. When the diameter of the y-pipe exceeds the above range, the fluidization effect may be affected, and catalysts may be easily accumulated on the y-pipe, forming a dead zone of catalysts.

Similarly, since the y-pipe needs to be installed on the x-pipe, the diameter of the x-pipe is preferably larger than the diameter of the y-pipe. The lower limit of the diameter of the x-pipe is preferably 250 mm or more, and more preferably 300 mm or more. The upper limit of the diameter of the x-pipe is preferably 700 mm or less, and more preferably 650 mm or less.

The inventor further found that when the propylene and ammonia feed distributor designed based on the existing conditions for the industrial production of acrylonitrile meets the aforementioned requirements for size, structural design, and diameter, the x-, y-, and/or z-pipes included in the feed distributer each always show an average rate of temperature rise of a certain range due to their respective lengths and diameters, the mass flow of the gas mixture passing therethrough, and the initial temperature ($T_0$) and reaction temperature ($T_R$) of the gas mixture fed thereinto.

The propylene and ammonia feed distributor can be provided with the x-pipe, which feeds the propylene and ammonia mixed gas therein directly into the y-pipe. Therefore, there is no change in mass flow of the gas mixture during the travel of the gas mixture in the x-pipe, and the average rate of temperature rise of the gas mixture is basically a fixed value. According to a large number of calculations and experimental verifications by the inventor, in general, the average rate a of temperature rise of the gas mixture in the x-pipe is preferably in the range of 2-9° C./m.

Since it is necessary to ensure that the propylene and ammonia mixed gas enters the reactor uniformly, the propylene and ammonia feed distributor preferably adopts a symmetrical design, and the changes in mass flow of the propylene and ammonia mixed gas in respective y-pipes of the feed distributor are basically the same. According to a large number of calculations and experimental verifications by the inventor, in general, the average rate b of temperature rise of the gas mixture in the y-pipe of the propylene and ammonia feed distributor is preferably in the range of 9-20° C./m.

Since the numbers of nozzles included in respective z-pipes are not exactly the same and the initial temperatures of the gas mixture at the joints between respective z-pipes and y-pipes are not the same, the average rates of temperature rise of respective z-pipes of the propylene and ammonia distributor are different. Each z-pipe has an independent average rate of temperature rise. According to a large number of calculations and experimental verifications by the inventor, in general, an average rate $c_j$ (j represents an integer of 1 or more) of temperature rise of the propylene and ammonia mixed gas in respective z-pipes is preferably in the range of 30-120° C./m.

According to the requirements of production capacity of acrylonitrile, the size of the reactor and the shape of the feed distributor usually vary a lot. However, based on the aforementioned findings, the inventor has found through a large number of calculations and experimental verifications that it is possible to design a suitable feed distribution by combining the size of the reactor and the shape of the feed distributor and using a suitable initial temperature $T_0$ of the gas mixture, the feed distributor system being able to completely avoid the formation of a gas mixture with a temperature higher than the nitridation temperature in the pipes.

Specifically, as described above, in the feed distributor, a is usually 2-9° C./m, b is usually 9-20° C./m, and $c_j$ is usually 30-120° C./m. Therefore, as long as the lengths X, Y, and Z of the x-, y-, and z-pipes are controlled, $\Delta T_i$ can be calculated according to formula (3), and together with the appropriate $T_0$, it can be ensured that the temperature of the gas mixture in the feed distributor is always lower than the nitridation temperature.

From the aforementioned findings of the inventor, it can be seen that the average rate of temperature rise of the propylene and ammonia mixed gas in the z-pipe of the feed distributor is significantly larger than the average rate of temperature rise of the gas mixture in the y-pipe, and the average rate of temperature rise in the y-pipe is greater than the average rate of temperature rise of the gas mixture in the x-pipe. The temperature of the gas mixture continuously rises during the travelling of the gas mixture in the x- and y-pipes, and the temperature rise of the gas mixture $\Delta T_i$ is the superposition of the temperature rise of the gas mixture in the x-, y-, and z-pipes. Therefore, if a feed distributor provided with only z-pipes in the reactor is considered, when compared with a feed distributor provided with x- and y-pipes in the reactor in addition to z-pipes, under otherwise identical conditions, the feed distributor provided with only z-pipes in the reactor may achieve a lower maximum temperature rise $\Delta T_{iMax}$ of the propylene and ammonia mixed gas. Here, the so-called maximum temperature rise $\Delta T_{iMax}$ refers to a maximum temperature rise that can be reached from an inlet of a feed distributer to nozzles in a same reactor. A skilled person can understand that the range of temperature rise in the feed distributor is determined by the maximum temperature rise $\Delta T_{iMax}$, because the initial temperature $T_0$ plus the maximum temperature rise $\Delta T_{iMax}$ must not exceed the nitridation temperature according to the design requirements of the feed distributor.

Therefore, in some embodiments provided in the present disclosure, as shown in FIG. 7, in the feed distributor, z-pipes directly communicate with inlets of the feed distributor on the reactor wall, so that the gas mixture is fed into the z-pipes through many inlets; therefore, only z-pipes are present in the reactor. A large number of experiments and calculations revealed that under otherwise identical conditions (such as reactor size, production scale, etc.), when compared with various propylene and ammonia distributors in the prior art and various feed distributors invented by the inventor, the feed distributor of the form shown in FIG. 7 can achieve the lowest maximum temperature rise $\Delta T_{iMax}$ of the propylene and ammonia mixed gas.

For example, in the case of the same reactor diameter and production scale, in a feed distributor in the form as shown in FIGS. 4A to 4D, since the propylene and ammonia mixed gas travels a longer path in the feed distributer before entering the catalyst bed, the actual temperature rise $\Delta T_i$ of the propylene and ammonia mixed gas in the feed distributor is greater than the temperature rise $\Delta T_i$ in the feed distributor shown in FIG. 7, and therefore the feed distributor in the form as shown in FIGS. 4A to 4D cannot achieve the lowest maximum temperature rise $\Delta T_{iMax}$ of the propylene and ammonia mixed gas.

Moreover, it should be understood that when the reactor diameter is in the range of 5-12 meters, as the reactor diameter increases, the length of the y-pipe and/or z-pipe of the feed distributor of the same type is extended accordingly, and thus the temperature rise of the gas mixture following through a pipe is greater. The length of a z-pipe is determined by the number of nozzles provided thereon and the interval between nozzles. The mass flow of the gas mixture in a z-pipe is the product of the number of nozzles and the mass flow of the gas mixture following out from a single nozzle. Assuming the same interval between nozzles and the same mass flow of the propylene and ammonia mixed gas following out from a single nozzle, the mass flow of the propylene and ammonia mixed gas flowing through the longest z-pipe will be increased accordingly. In the cases of z-pipes of a relatively fixed diameter, the average rate of temperature rise in a z-pipe will be slightly decreased. Therefore the temperature rise of the gas mixture flowing through the same distance will be decreased. Finally, the change in $\Delta T_i$ will be a combination of the aforementioned changes. The same is true for the change in the maximum temperature rise $\Delta T_{iMax}$.

A skilled person can thus understand that the maximum temperature rise $\Delta T_{iMax}$ varies with the change in reactor diameter. According to a large number of calculations and experimental verifications by the inventor, when it is contemplated that the reactor diameter is in the range of 5-12 m for a commercially acceptable feed distributor, the maximum temperature rise $\Delta T_{iMax}$ increases by about 10-17° C. for every 1 meter increase in reactor diameter.

In addition, the control of the final temperature of the gas mixture ejected from the nozzles cannot be achieved by determining only the maximum temperature rise $\Delta T_{iMax}$. According to formula (1), $\Delta T_i$ must be combined with $T_0$ to achieve the control of the final temperature of the gas mixture. Considering that $T_0$ also affects the average rate of temperature rise of a gas guide pipe, the inventor has found through a large number of calculations and experimental verifications that under otherwise identical conditions, for the z-pipe, the average rate of temperature rise decreases by about 0.7-1.3° C./m for every 10° C. increase in $T_0$.

In summary, in combination with the aforementioned realization conditions of the lowest maximum temperature rise $\Delta T_i$ in the feeding system, the inventor has confirmed that in the propylene and ammonia feeding system for industrial conditions provided in the present invention, in order to ensure that the final temperature of the gas mixture ejected from the nozzles does not exceed the corresponding nitridation temperature, the initial temperature $T_0$ of the propylene and ammonia mixed gas should be 220° C. or lower. Moreover, when the reactor diameter is larger, for example, when the reactor diameter is 7.5-12 meters, the initial temperature $T_0$ should be 200° C. or lower; when the reactor diameter is 8.5-12 meters, the initial temperature $T_0$ should be 185° C. or lower.

Moreover, during transportation of the gas mixture, a certain pressure is needed in order to ensure that the propylene and ammonia mixed gas can be smoothly fed into the reactor. At the same time, in order to avoid the condensate generated in the pipes due to a low temperature during transportation, it is necessary to transport the propylene and ammonia mixed gas in a superheated state from an evaporator to the propylene and ammonia feed distributor of the reactor. Therefore, in the feeding system of the present disclosure, $T_0$ is 10° C. or higher, preferably 20° C. or higher, more preferably 35° C. or higher, and still more preferably 45° C. or higher.

Therefore, in the case of a reactor diameter of 5-12 meters, by controlling the initial temperature $T_0$ of the propylene and ammonia mixed gas within the above range, the temperature of the propylene and ammonia mixed gas at any position in the feed distributor can be effectively controlled in a range lower than the nitridation temperature.

In addition, in order to control the initial temperature $T_0$ within the above range, the feed gas feeding system of the present disclosure is also provided with a feed gas mixing system 2. The feed gas mixing system 2 in the feed gas feeding system of the present disclosure is described below with reference to the drawings. As shown in FIG. 6, the feed gas mixing system 2 includes a propylene evaporator 11, a propylene superheater 13, an ammonia evaporator 12, an ammonia superheater 14, and a pipeline mixer 15. As described above, raw material propylene enters a mixing line from the propylene evaporator 11 through the propylene superheater 13. Similarly, the raw material ammonia also enters the mixing line from the ammonia evaporator 12 through the ammonia superheater 14. The raw material propylene and the raw material ammonia are mixed in the mixing line and then enter a feed distributor 10.

Figure 5A:
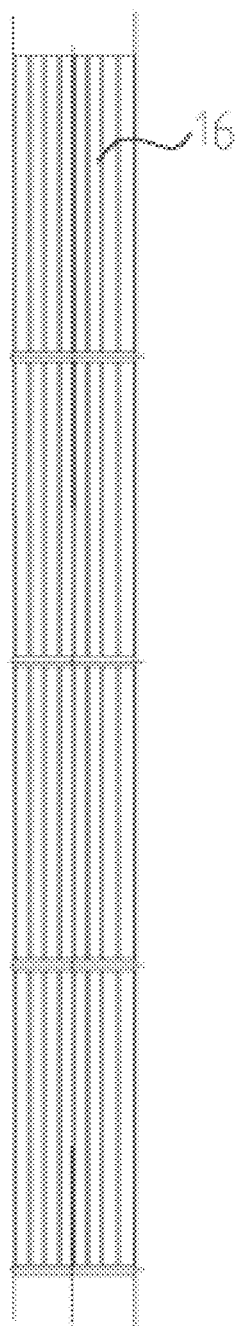
FIG. 5A is a longitudinal sectional view of a mixer pipe of the present disclosure.
Figure 5B:
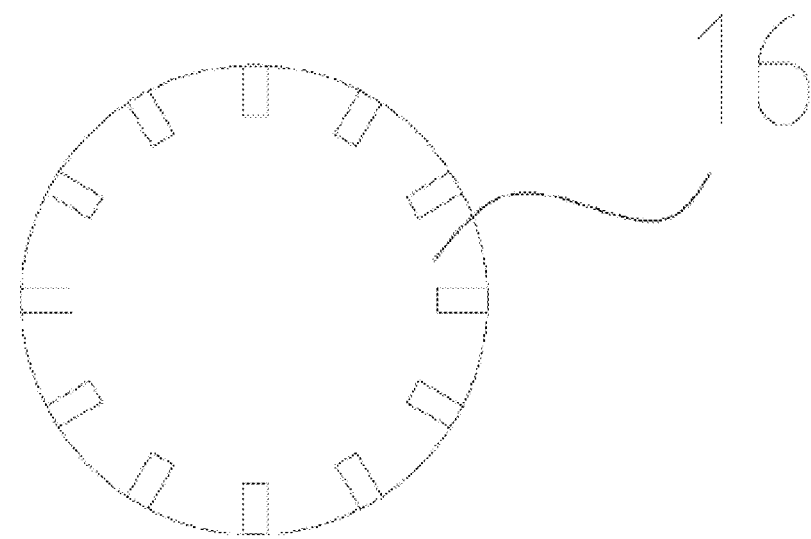
FIG. 5B is a cross-sectional view of the mixer pipe of the present disclosure.

In order to achieve sufficient mixing of propylene and ammonia before entering the feed distributor 10, the feed gas mixing system 2 of the propylene and ammonia feed gas feeding system of the present disclosure further includes a pipeline mixer 15. The role of the pipeline mixer is to make raw material gases from the superheaters be mixed more uniformly in the mixing line, so that the gas mixture ejected from respective nozzles of the propylene and ammonia distributor has the same ratio of raw material gases. The mixing line of the raw material propylene and ammonia can be used directly as a pipeline mixer. There is no limitation to the specific installation position of the pipeline mixer including internal components in the propylene and ammonia mixing line, and it may be installed in any position in the pipeline containing the propylene and ammonia mixed gas, but preferably, the line mixer 15 is provided in the pipeline of the propylene and ammonia mixed gas near the reactor. Preferably, an inner member 16 as shown in FIG. 5B may be added in the line mixer 15. The specific shape of the inner member is not particularly limited, and it may have a fin-like shape as shown in FIG. 5B or other shapes.

Although feed gas pipelines between the superheaters and a propylene and ammonia inlet of a reactor is provided with insulation means, the feed gas always suffers a certain heat loss in the pipelines between the propylene and ammonia superheaters and the propylene and ammonia inlet of the reactor due to the limitation of the overall layout of apparatus by production enterprises. The temperature of the feed gas after being superheated by the superheaters is higher than the temperature at which the feed gas reaches the propylene and ammonia inlet. Moreover, in different seasons, the degree of heat loss also varies due to the difference in temperature difference between the feed gas and the external environment. In addition, for different sizes of apparatus and different design forms of propylene and ammonia distributor, the design value of the initial temperature $T_0$ at the inlet of the propylene and ammonia distributor also varies.

In order to avoid fluctuations in the initial temperature $T_0$ due to external uncertain factors, the propylene and ammonia feed gas feeding system of the present disclosure further includes an initial temperature $T_0$ control system at the inlet of the propylene and ammonia feed distributor. As shown in FIG. 6, the initial temperature $T_0$ control system includes a transmitter, a heat source, bypass valves, and controllers. The transmitter is provided at the inlet of the feed distributor, and configured to detect the initial temperature $T_0$. The heat source (such as low-pressure steam LP; the temperature and pressure of the heat source are generally considered to be stable, and the heat source is hereinafter sometimes referred to as heat source LP) is configured to supply heat to the propylene superheater 12 and the ammonia superheater 14. The bypass valves are provided on a pipeline connected between the heat source LP and the propylene superheater 12 and on a pipeline connected between the heat source LP and the ammonia superheater 14, respectively. The controllers are configured to receive a signal from the transmitter and adjust an opening degree of the respective bypass valves in response to the signal from the transmitter.

The precise temperature control of the temperature $T_0$ at the inlet of the propylene and ammonia feed distributor is generally achieved by adjusting the flow rate of a heat source, such as low-pressure steam, supplied to feed gas superheaters in response to a measured temperature $T_0$ of the propylene and ammonia mixed gas at the inlet. Specifically, as shown in FIG. 6, when the measured temperature of the propylene and ammonia mixed gas at the inlet is lower than a design initial temperature $T_0$, the temperature transmitter transmits a signal to the controllers, and the controllers adjust an opening degree of the respective bypass valves in response to the signal to increase the flow of the heat source and increase the temperatures of feed gases at the outlets of the respective superheaters, so that the temperature $T_0$ at the inlet of the propylene and ammonia feed distributor reaches the designed initial temperature. Conversely, when the measured temperature of the propylene and ammonia mixed gas at the inlet is higher than the designed initial temperature $T_0$, the temperature transmitter transmits a signal to the controllers, and the controllers adjust an opening degree of the respective bypass valves in response to the signal to reduce the flow of the heat source and reduce the temperature of feed gases at the outlets of the respective superheaters, so that the temperature $T_0$ at the inlet of the propylene and ammonia feed distributor reaches the designed initial temperature. In general, after a propylene gas and an ammonia gas are superheated by the respective superheaters, the temperatures of the propylene gas and ammonia gas at the outlets of the respective superheaters are similar, and the operation of the propylene superheater bypass valve controller and the ammonia superheater bypass valve controller are both responsive to the inlet temperature, and the operation of the controller of the bypass valve of the propylene superheater and the operation of the controller of the bypass valve of the ammonia superheater are both responsive to the temperature $T_0$ at the inlet.

EXAMPLE

Embodiments of the present disclosure will be described in further detail by way of specific examples.

All data in the following examples were obtained in a laboratory by simulating conditions in ammoxidation fluidized bed reactors with diameters of 5.0 m, 5.4 m, 7.5 m, 8.5 m, 10 m, and 12 m, respectively. Actual feed distributors were simulated with carbon steel as a material according to the forms of various feed distributors in the drawings of the description, and temperature transmitters were provided at important nodes to measure the temperature of the feed distributors and calculate corresponding average rates of temperature rise. In the following examples and comparative examples, all data were averaged after multiple measurements.

Example 1

A fluidized bed reactor had a diameter of 5.0 m, and an apparatus was operated at full load. A feed gas ratio $C_3H_6$: $NH_3$: air was 1:1.2:9.3, a reaction temperature was 440° C., and a reaction pressure was 55 KPa. A propylene and ammonia distributor had the form as shown in FIG. 7, was made of carbon steel, and had z-pipes of a diameter of φ80 mm. A propylene and ammonia mixed gas reached tail end nozzles of respective z-pipes through the propylene and ammonia distributor, wherein the propylene and ammonia mixed gas reached the furthest tail end nozzle when it traveled a traveling length of 2.42 m in a corresponding z-pipe. According to relevant model data and available experimental data, the temperature of the propylene and ammonia mixed gas at an inlet of the distributer was controlled to 220° C., the average rate of temperature rise per unit length when the propylene and ammonia mixed gas traveled in a z-pipe was 52° C./m, and the temperature of the propylene and ammonia mixed gas at said furthest tail end nozzle was 346° C.

Example 2

A fluidized bed reactor had a diameter of 5.4 m, and an apparatus was operated at full load. A feed gas ratio $C_3H_6$:$NH_3$: air was 1:1.2:9.3, a reaction temperature was 440° C., and a reaction pressure was 55 KPa. A propylene and ammonia distributor had the form as shown in FIG. 7, was made of carbon steel, and had z-pipes of a diameter of φ90 mm. A propylene and ammonia mixed gas reached tail end nozzles of respective z-pipes through the propylene and ammonia distributor, wherein the propylene and ammonia mixed gas reached the furthest tail end nozzle when it traveled a traveling length of 2.6 m in a corresponding z-pipe. According to relevant model data and available experimental data, the temperature of the propylene and ammonia mixed gas at an inlet of the distributer was controlled to 160° C., the average rate of temperature rise per unit length when the propylene and ammonia mixed gas traveled in a z-pipe was 60° C./m, and the temperature of the propylene and ammonia mixed gas at said furthest tail end nozzle was 316° C.

Example 3

A fluidized bed reactor had a diameter of 7.5 m, and an apparatus was operated at full load. A feed gas ratio, a reaction temperature, and a reaction pressure were the same as those in Example 1. A propylene and ammonia distributor had the form as shown in FIG. 7, was made of carbon steel, and had z-pipes of a diameter of φ90 mm. A propylene and ammonia mixed gas reached tail end nozzles of respective z-pipes through the propylene and ammonia distributor, wherein the propylene and ammonia mixed gas reached the furthest tail end nozzle when it traveled a traveling length of 3.65 m in a corresponding z-pipe. According to relevant model data and available experimental data, the temperature of the propylene and ammonia mixed gas at an inlet of the distributer was controlled to 200° C., the average rate of temperature rise per unit length when the propylene and ammonia mixed gas traveled in a z-pipe was 40° C./m, and the temperature of the propylene and ammonia mixed gas at said furthest tail end nozzle was 346° C.

Example 4

A fluidized bed reactor had a diameter of 8.5 m, and an apparatus was operated at full load. A feed gas ratio, a reaction temperature, and a reaction pressure were the same as those in Example 1. A propylene and ammonia distributor had the form as shown in FIG. 7, was made of carbon steel, and had z-pipes of a diameter of φ90 mm. A propylene and ammonia mixed gas reached tail end nozzles of respective z-pipes through the propylene and ammonia distributor, wherein the propylene and ammonia mixed gas reached the furthest endmost when it traveled a traveling length of 4.15 m in a corresponding z-pipe. According to relevant model data and available experimental data, the temperature of the propylene and ammonia mixed gas at an inlet of the distributer was controlled to 185° C., the average rate of temperature rise per unit length when the propylene and ammonia mixed gas traveled in a z-pipe was 39° C./m, and the temperature of the propylene and ammonia mixed gas at said furthest tail end nozzle is 347° C.

Example 5

A fluidized bed reactor had a diameter of 12 m, and an apparatus was operated at full load. A feed gas ratio, a reaction temperature, and a reaction pressure were the same as those in Example 1. A propylene and ammonia distributor had the form as shown in FIG. 7, was made of carbon steel, and had z-pipes of a diameter of φ110 mm. A propylene and ammonia mixed gas reached tail end nozzles of respective z-pipes through the propylene and ammonia distributor, wherein the propylene and ammonia mixed gas reached the furthest tail end nozzle when it traveled a traveling length of 5.9 m in a corresponding z-pipe. According to relevant model data and available experimental data, the temperature of the propylene and ammonia mixed gas at an inlet of the distributer was controlled to 130° C., the average rate of temperature rise of temperature rise per unit length when the propylene and ammonia mixed gas traveled in a z-pipe was 37° C./m, and the temperature of the propylene and ammonia mixed gas at said furthest tail end nozzle was 348° C.

Example 6

A fluidized bed reactor had a diameter of 10 m, and an apparatus was operated at full load. A feed gas ratio, a reaction temperature, and a reaction pressure were the same as those in Example 1. A propylene and ammonia distributor had a form of a combination of FIG. 4A and FIG. 4C, and was made of carbon steel. An x-pipe had a diameter of φ450 mm, a y-pipe had a diameter of φ250 mm, and a z-pipe had a diameter of φ90 mm. The traveling length of a propylene and ammonia mixed gas in the x-pipe was 13 m. The propylene and ammonia mixed gas reached tail end nozzles of respective z-pipes through the pipes of the propylene and ammonia distributor, and the temperature of the propylene and ammonia mixed gas at an inlet of the distributer was controlled to 52° C. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 13 m, 4.1 m, and 2.8 m in an x-pipe, y-pipe, and z-pipe, respectively. The average rates of temperature rise per unit length when the propylene and ammonia mixed gas traveled in an x-pipe, y-pipe, and z-pipe were 4.5° C./m, 13.5° C./m, and 55° C./m, respectively. Thus, the temperature of the propylene and ammonia mixed gas at said tail end nozzle was 319° C.

Example 7

A fluidized bed reactor had a diameter of 10 m, and an apparatus was operated at full load. A feed gas ratio, a reaction temperature, and a reaction pressure were the same as those in Example 1. A propylene and ammonia distributor had a form of a combination of FIG. 4A and FIG. 4B, and was made of carbon steel. An x-pipe had a diameter of φ500 mm, a y-pipe had a diameter of φ250 mm, and a z-pipe had a diameter of φ100 mm. The traveling length of a propylene and ammonia mixed gas in the x-pipe was 8 m. The propylene and ammonia mixed gas reached tail end nozzles of respective z-pipes through the pipes of the propylene and ammonia distributor, and the temperature $T_0$ of the propylene and ammonia mixed gas at an inlet of the distributer was controlled to 36° C. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 8 m, 0.3 m, and 4.8 m in an x-pipe, y-pipe, and z-pipe, respectively. The average rates of temperature rise per unit length when the propylene and ammonia mixed gas traveled in an x-pipe, y-pipe, and z-pipe were 4° C./m, 13° C./m, and 50° C./m, respectively. Thus, the temperature of the propylene and ammonia mixed gas at said tail end nozzle was 312° C.

Example 8

A fluidized bed reactor had a diameter of 10 m, and an apparatus was operated at full load. A feed gas ratio, a reaction temperature, and a reaction pressure were the same as those in Example 1. A propylene and ammonia distributor had a form of a combination of FIG. 1 and FIG. 4D, and was made of carbon steel. A y-pipe had a diameter of φ300 mm, and a z-pipe had a diameter of φ100 mm. The propylene and ammonia mixed gas reached tail end nozzles of respective z-pipes through the pipes of the propylene and ammonia distributor, and the temperature of the propylene and ammonia mixed gas at an inlet of the distributer was controlled to 110° C. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 1.3 m and 3.4 m in a y-pipe and z-pipe, respectively. The average rates of temperature rise per unit length when the propylene and ammonia mixed gas traveled in a y-pipe and z-pipe were 14.5° C./m and 58° C./m, respectively. Thus, the temperature of the propylene and ammonia mixed gas at said tail end nozzle was 326° C.

Example 9

A fluidized bed reactor had a diameter of 7.5 m, and an apparatus was operated at full load. A feed gas ratio, a reaction temperature, and a reaction pressure were the same as those in Example 1. A propylene and ammonia distributor had a form of a combination of FIG. 4A and FIG. 4C, and was made of carbon steel. An x-pipe had a diameter of φ320 mm, a y-pipe had a diameter of φ220 mm, and a z-pipe had a diameter of φ90 mm. The traveling length of a propylene and ammonia mixed gas in the x-pipe was 14 m. The propylene and ammonia mixed gas reached tail end nozzles of respective z-pipes through the pipes of the propylene and ammonia distributor, and the temperature of the propylene and ammonia mixed gas at an inlet of the distributer was controlled to 80° C. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 14 m, 2.7 m, and 2.2 m in an x-pipe, y-pipe, and z-pipe, respectively. The average rates of temperature rise per unit length when the propylene and ammonia mixed gas traveled in an x-pipe, y-pipe, and z-pipe were 5.8° C./m, 13.4° C./m, and 4.6° C./m, respectively. Thus, the temperature of the propylene and ammonia mixed gas at said tail end nozzle is 298° C.

Example 10

A fluidized bed reactor had a diameter of 12 m, and an apparatus was operated at full load. A feed gas ratio, a reaction temperature, and a reaction pressure were the same as those in Example 1. A propylene and ammonia distributor had a form of a combination of FIG. 4A and FIG. 4C, and was made of carbon steel. An x-pipe had a diameter of φ550 mm, a y-pipe had a diameter of φ250 mm, and a z-pipe had a diameter of φ100 mm. The traveling length of a propylene and ammonia mixed gas in the x-pipe was 15 m. The propylene and ammonia mixed gas reached tail end nozzles of respective z-pipes through the pipes of the propylene and ammonia distributor, and the temperature of the propylene and ammonia mixed gas at an inlet of the distributer was controlled to 80° C. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 15 m, 4.4 m, and 3.6 m in an x-pipe, y-pipe, and z-pipe, respectively. The average rates of temperature rise per unit length when the propylene and ammonia mixed gas traveled in an x-pipe, y-pipe, and z-pipe were 3.3° C./m, 11° C./m, and 43° C./m, respectively. Thus, the temperature of the propylene and ammonia mixed gas at said tail end nozzle was 333° C.

Example 11

A fluidized bed reactor had a diameter of 12 m, and an apparatus was operated at full load. A feed gas ratio, a reaction temperature, and a reaction pressure were the same as those in Example 1. A propylene and ammonia distributor had a form of a combination of FIG. 4A and FIG. 4C, and was made of carbon steel. An x-pipe had a diameter of φ550 mm, a y-pipe had a diameter of φ250 mm, and a z-pipe had a diameter of φ100 mm. The traveling length of a propylene and ammonia mixed gas in the x-pipe was 15 m. The propylene and ammonia mixed gas reached tail end nozzles of respective z-pipes through the pipes of the propylene and ammonia distributor, and the temperature of the propylene and ammonia mixed gas at an inlet of the distributer was controlled to 40° C. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 15 m, 4.4 m, and 3.6 m in an x-pipe, y-pipe, and z-pipe, respectively. The average rates of temperature rise per unit length when the propylene and ammonia mixed gas traveled in an x-pipe, y-pipe, and z-pipe were 3.3° C./m, 11.2° C./m, and 46° C./m, respectively. Thus, the temperature of the propylene and ammonia mixed gas at said tail end nozzle was 304° C.

Comparative Example 1

A fluidized bed reactor had a diameter of 10 m, and an apparatus was operated at full load. A feed gas ratio, a reaction temperature, and a reaction pressure were the same as those in Example 1. A propylene and ammonia distributor had a form of a combination of FIG. 4A and FIG. 4B, and was made of carbon steel. An x-pipe had a diameter of φ500 mm, a y-pipe had a diameter of φ250 mm, and a z-pipe had a diameter of φ90 mm. The traveling length of a propylene and ammonia mixed gas in the x-pipe was 13 m. The propylene and ammonia mixed gas reached tail end nozzles of respective z-pipes through the pipes of the propylene and ammonia distributor. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 13 m, 0.3 m, and 4.8 m in an x-pipe, y-pipe, and z-pipe, respectively. The temperature $T_0$ of the propylene and ammonia mixed gas at an inlet of the distributer was controlled to 7° C. The average rates of temperature rise per unit length when the propylene and ammonia mixed gas traveled in an x-pipe, y-pipe, and z-pipe were 4.1° C./m, 13.5° C./m, and 58° C./m, respectively. Thus, the temperature of the propylene and ammonia mixed gas at said tail end nozzle was 343° C. In addition, it was also found that a feed gas condensate was produced at the inlet of the propylene and ammonia distributor.

Comparative Example 2

A fluidized bed reactor had a diameter of 12 m, and an apparatus was operated at full load. A feed gas ratio, a reaction temperature, and a reaction pressure were the same as those in Example 1. A propylene and ammonia distributor had a form of a combination of FIG. 4A and FIG. 4C, and was made of carbon steel. An x-pipe had a diameter of φ50 mm, a y-pipe had a diameter of φ400 mm, and a z-pipe had a diameter of φ30 mm. The traveling length of a propylene and ammonia mixed gas in the x-pipe was 14.5 m. The propylene and ammonia mixed gas reached tail end nozzles of respective z-pipes through the pipes of the propylene and ammonia distributor, and the temperature of the propylene and ammonia mixed gas at an inlet of the distributer was controlled to 130° C. According to relevant model data and available experimental data, the propylene and ammonia mixed gas in the propylene and ammonia distributor of this form reached a maximum temperature when the propylene and ammonia mixed gas traveled to the tail end nozzle on the longest z-pipe, i.e., when the propylene and ammonia mixed gas traveled a traveling length of 14.5 m, 4.1 m, and 4.3 m in an x-pipe, y-pipe, and z-pipe, respectively. The average rates of temperature rise per unit length when the propylene and ammonia mixed gas traveled in an x-pipe, y-pipe, and z-pipe were 3.0° C./m, 8.5° C./m, and 35° C./m, respectively. Thus, the temperature of the propylene and ammonia mixed gas at said tail end nozzle was 359° C.

Comparative Example 3

A fluidized bed reactor had a diameter of 5.0 m, and an apparatus was operated at full load. A feed gas ratio, a reaction temperature, and a reaction pressure were the same as those in Example 1. A propylene and ammonia distributor had a form as shown in FIG. 7, was made of carbon steel, and had z-pipes of a diameter of φ80 mm A propylene and ammonia mixed gas reached tail end nozzles of respective z-pipes through the propylene and ammonia distributor, wherein the propylene and ammonia mixed gas reached the furthest tail end nozzle when it traveled a traveling length of 5.9 m in a corresponding z-pipe. According to relevant model data and available experimental data, the average rate of temperature rise of the propylene and ammonia mixed gas per unit length when the propylene and ammonia mixed gas traveled in a z-pipe was 52° C./m, the temperature of the propylene and ammonia mixed gas at an inlet of the distributer was controlled to 225° C., and the temperature of the propylene and ammonia mixed gas at said tail end nozzle was 352° C.

In Examples 1-11 in which the feed gas feeding system of the present disclosure is used, a temperature T of the propylene and ammonia mixed gas at any position of the feed distributor is lower than 350° C., i.e., lower than the temperature at which ammonia decomposes into active nitrogen atoms. In comparison, in Comparative Example 1, when certain parameters of the feed system fell outside the range of the present application, it was found that a feed gas condensate was produced at the inlet of the propylene and ammonia distributor, which is liable to cause inaccurate feed quantity of the feed gas, while in Comparative Examples 2 and 3, brittle fractures of the propylene and ammonia distributor is easily caused, which increases the frequency of replacement of distributor.

The technical solutions of the present disclosure have been described in detail according to the embodiments, but the scope of protection of the present application is not limited thereto.

Although the present disclosure has been described with reference to the preferred embodiments, various modifications can be made to the present disclosure and the components herein can be replaced with equivalents without departing from the scope of the present disclosure. In particular, the technical features mentioned in the embodiments can be combined in any manner as long as there is no structural conflict. The present disclosure is not limited to the specific embodiments disclosed herein, but includes all technical solutions falling within the scope of the claims.

The invention claimed is:

1. A feed gas feeding system for a propylene ammoxidation reactor, comprising a feed gas mixing system and a feed distributor, wherein a propylene and ammonia mixed gas is mixed by the feed gas mixing system and then uniformly distributed in the propylene ammoxidation reactor by the feed distributor, wherein an initial temperature $T_0$ when the propylene and ammonia mixed gas enters the feed distributor is 10-220° C.;

wherein the feed gas mixing system comprises a propylene evaporator, a propylene superheater, an ammonia evaporator, an ammonia superheater, and a pipeline mixer, wherein the propylene evaporator and the ammonia evaporator are in communication with the pipeline mixer, respectively, the propylene superheater is provided between the propylene evaporator and the pipeline mixer, and the ammonia superheater is provided between the ammonia evaporator and the pipeline mixer, and wherein the pipeline mixer is an empty pipeline, or a pipeline provided with an inner component; and the feed gas mixing system further comprises an initial temperature $T_0$ control system, wherein the initial temperature $T_0$ control system comprises:

a transmitter provided at an inlet of the feed distributor and configured to detect the initial temperature $T_0$;

a heat source configured to supply heat to the propylene superheater and the ammonia superheater;

bypass valves provided on a pipeline connected between the heat source and the propylene superheater, and on a pipeline connected between the heat source and the ammonia superheater, respectively; and controllers configured to receive a signal from the transmitter and adjust an opening degree of the respective bypass valves in response to the signal from the transmitter, so as to achieve control of the initial temperature $T_0$.

2. The feed gas feeding system according to claim 1, wherein the propylene ammoxidation reactor has a diameter of 5-12 meters.

3. The feed gas feeding system according to claim 2, wherein the propylene ammoxidation reactor has a diameter of 7.5-12 meters.

4. The feed gas feeding system according to claim 3, wherein the propylene ammoxidation reactor has a diameter of 8.5-12 meters.

5. A method for controlling a temperature of a propylene and ammonia mixed gas in a propylene ammoxidation reactor, wherein the propylene ammoxidation reactor comprises a feeding system, the feeding system comprises a feed gas mixing system and a feed distributor, wherein a propylene and ammonia mixed gas is mixed by the feed gas mixing system and then uniformly distributed in the propylene ammoxidation reactor through the feed distributor, and wherein the method comprises: enabling an initial temperature $T_0$ when the propylene and ammonia mixed gas enters the feed distributor to be 10-220° C.; and the method further comprises controlling the initial temperature $T_0$ via a process comprising:

supplying heat to a propylene superheater and an ammonia superheater by a heat source;

detecting the initial temperature $T_0$ using a transmitter provided at an inlet of the feed distributor; and adjusting, according to the initial temperature $T_0$ detected by the transmitter, an opening degree of bypass valves provided on a pipeline connected between the heat source and the propylene superheater, and on a pipeline connected between the heat source and the ammonia superheater, respectively, so as to adjust the initial temperature $T_0$.

6. The method according to claim 5, comprising: enabling the initial temperature $T_0$ when the propylene and ammonia mixed gas enters the feed distributor to be 20-200° C.

7. The method according to claim 6, comprising: enabling the initial temperature $T_0$ when the propylene and ammonia mixed gas enters the feed distributor to be 35-185° C.

8. The method according to claim 5, wherein the propylene ammoxidation reactor has a diameter of 5-12 meters.

9. The method according to claim 8, wherein the propylene ammoxidation reactor has a diameter of 7.5-12 meters.

10. The method according to claim 9, wherein the propylene ammoxidation reactor has a diameter of 8.5-12 meters.

11. A feed gas feeding system for a propylene ammoxidation reactor, comprising a feed gas mixing system and a feed distributor, wherein a propylene and ammonia mixed gas is mixed by the feed gas mixing system and then uniformly distributed in the propylene ammoxidation reactor by the feed distributor, wherein an initial temperature $T_0$ when the propylene and ammonia mixed gas enters the feed distributor is 20-200° C.;

wherein the feed gas mixing system comprises a propylene evaporator, a propylene superheater, an ammonia evaporator, an ammonia superheater, and a pipeline mixer, wherein the propylene evaporator and the ammonia evaporator are in communication with the pipeline mixer, respectively, the propylene superheater is provided between the propylene evaporator and the pipeline mixer, and the ammonia superheater is provided between the ammonia evaporator and the pipeline mixer, and wherein the pipeline mixer is an empty pipeline, or a pipeline provided with an inner component; and the feed gas mixing system further comprises an initial temperature $T_0$ control system, wherein the initial temperature $T_0$ control system comprising comprises:

a transmitter provided at an inlet of the feed distributor and configured to detect the initial temperature $T_0$;

a heat source configured to supply heat to the propylene superheater and the ammonia superheater;

bypass valves provided on a pipeline connected between the heat source and the propylene superheater, and on a pipeline connected between the heat source and the ammonia superheater, respectively; and controllers configured to receive a signal from the transmitter and adjust an opening degree of the respective bypass valves in response to the signal from the transmitter, so as to achieve control of the initial temperature $T_0$.

12. A feed gas feeding system for a propylene ammoxidation reactor, comprising a feed gas mixing system and a feed distributor, wherein a propylene and ammonia mixed gas is mixed by the feed gas mixing system and then uniformly distributed in the propylene ammoxidation reactor by the feed distributor, wherein an initial temperature $T_0$ when the propylene and ammonia mixed gas enters the feed distributor is 35-185° C.;

wherein the feed gas mixing system comprises a propylene evaporator, a propylene superheater, an ammonia evaporator, an ammonia superheater, and a pipeline mixer, wherein the propylene evaporator and the ammonia evaporator are in communication with the pipeline mixer, respectively, the propylene superheater is provided between the propylene evaporator and the pipeline mixer, and the ammonia superheater is provided between the ammonia evaporator and the pipeline mixer, and wherein the pipeline mixer is an empty pipeline, or a pipeline provided with an inner component; and the feed gas mixing system further comprises an initial temperature $T_0$ control system, wherein the initial temperature $T_0$ control system comprising comprises:

a transmitter provided at an inlet of the feed distributor and configured to detect the initial temperature $T_0$;

a heat source configured to supply heat to the propylene superheater and the ammonia superheater;

bypass valves provided on a pipeline connected between the heat source and the propylene superheater, and on a pipeline connected between the heat source and the ammonia superheater, respectively; and controllers configured to receive a signal from the transmitter and adjust an opening degree of the respective bypass valves in response to the signal from the transmitter, so as to achieve control of the initial temperature $T_0$.

* * * * *